(12) United States Patent
Babazadeh

(10) Patent No.: US 9,899,930 B2
(45) Date of Patent: Feb. 20, 2018

(54) METHOD AND APPARATUS FOR PHASE ALIGNMENT IN SEMI-RESONANT POWER CONVERTERS TO AVOID SWITCHING OF POWER SWITCHES HAVING NEGATIVE CURRENT FLOW

(71) Applicant: Infineon Technologies Austria AG, Villach (AT)

(72) Inventor: Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/154,434

(22) Filed: May 13, 2016

(65) Prior Publication Data

US 2017/0331386 A1    Nov. 16, 2017

(51) Int. Cl.
*H02M 3/158*    (2006.01)
*H02M 3/335*    (2006.01)
*H02M 1/08*    (2006.01)
*H02M 1/14*    (2006.01)
*H02M 1/00*    (2006.01)

(52) U.S. Cl.
CPC ......... *H02M 3/33592* (2013.01); *H02M 1/08* (2013.01); *H02M 1/14* (2013.01); *H02M 3/1582* (2013.01); *H02M 2001/0009* (2013.01)

(58) Field of Classification Search
None
See application file for complete search history.

(56) References Cited

U.S. PATENT DOCUMENTS

| 6,486,642 | B1 * | 11/2002 | Qian | H02M 3/158 323/255 |
| 7,321,224 | B2 * | 1/2008 | Iwamoto | H02M 1/34 323/222 |
| 9,350,244 | B2 | 5/2016 | Tang et al. | |
| 2002/0118000 | A1 * | 8/2002 | Xu | H02M 3/158 323/259 |

(Continued)

OTHER PUBLICATIONS

Hwu, K. I. et al., "Ultrahigh Step-Down Converter", IEEE Transactions on Power Electronics, vol. 30, No. 6, Jun. 2015, pp. 3262-3274.

*Primary Examiner* — Jeffrey Gblende
(74) *Attorney, Agent, or Firm* — Murphy, Bilak & Homiller, PLLC

(57) ABSTRACT

Each phase of a multi-phase voltage converter includes a power stage, passive circuit, synchronous rectification (SR) switch, and control circuit. Each passive circuit couples its power stage to an output node of the voltage converter, and is switchably coupled to ground by the SR switch. The current through the SR switch has a half-cycle sinusoidal shape with a resonant frequency determined by the reactance of the passive circuit. The control circuit generates signals to control switches within the power stage and the SR switches. The control circuit measures current through the SR switch of each phase, and determines which of the phases has SR switch current which returns to zero the quickest. This phase is identified as a master, and the other phases of the voltage converter are aligned to this master phase such that none of the SR switches is turned off when negative current is flowing through it.

21 Claims, 9 Drawing Sheets

(56) References Cited

U.S. PATENT DOCUMENTS

| | | | |
|---|---|---|---|
| 2010/0013307 A1* | 1/2010 | Heineman | G06F 1/26 307/33 |
| 2010/0013451 A1* | 1/2010 | Nakamura | H02M 3/1588 323/282 |
| 2011/0254526 A1* | 10/2011 | Luo | H02M 3/1584 323/284 |
| 2012/0249102 A1* | 10/2012 | Cuk | H02M 3/158 323/282 |
| 2014/0293360 A1 | 10/2014 | Inukai | |
| 2015/0115911 A1* | 4/2015 | Parto | H02M 3/158 323/271 |
| 2015/0264769 A1 | 9/2015 | Jelaca et al. | |
| 2016/0145062 A1 | 5/2016 | Kamatani | |
| 2016/0254766 A1 | 9/2016 | Brown | |
| 2016/0336873 A1 | 11/2016 | Ayai | |
| 2017/0063227 A1 | 3/2017 | Nakamura | |
| 2017/0104422 A1 | 4/2017 | Okumura et al. | |

\* cited by examiner

METHOD AND APPARATUS FOR PHASE ALIGNMENT IN SEMI-RESONANT POWER CONVERTERS TO AVOID SWITCHING OF POWER SWITCHES HAVING NEGATIVE CURRENT FLOW

TECHNICAL FIELD

The present application relates to multi-phase semi-resonant and resonant converters and, in particular, relates to techniques for aligning the timing of switch control signals for the phases of such a converter.

BACKGROUND

Resonant and semi-resonant DC-DC converters, including isolated and non-isolated topologies, are used in a variety of applications including telecommunications, consumer electronics, computer power supplies, etc. The usage of such converters is gaining popularity because of their zero-voltage switching (ZVS) and/or zero-current switching (ZCS) characteristics, and their ability to utilize parasitic electrical properties inherent in an electronic circuit. Among numerous topologies, the semi-resonant converter with transformer/center-tapped inductor is an attractive topology for providing high voltage-conversion ratios without requiring isolation. Such converters provide advantages including lower cost and higher efficiency as compared to other solutions.

One class of semi-resonant converters includes high-side and low-side switches that transfer power from an input source to a center-tapped inductor that supplies output power to a load. The center-tapped inductor is also connected to a second low-side switch, which is termed a synchronous rectification (SR) switch herein. In order to meet the power requirements for a load of a semi-resonant converter (e.g., provide a near constant output voltage for the load), many semi-resonant DC-DC convertersemploy a variable switching frequency wherein the switching period can vary from cycle to cycle. During a portion of each switching period, the SR switch will be enabled such that current flows through it. For the semi-resonant converter described above, the current during this portion of a switching period will be shaped like one half cycle of a sinusoidal period. The time interval for this half-cycle sinusoid is determined by reactive elements within passive circuitry of the semi-resonant converter, e.g., the natural frequency of an inductor/capacitor (LC) resonant tank and other passive components within the semi-resonant DC-DC converter determine this time interval.

It is highly desirable to turn the power switches of a resonant or semi-resonant DC-DC converter on and off when the voltage or current across the relevant switch is at or near zero. Such soft switching has an advantage that switch losses are minimized. Additionally, soft switching avoids electromagnetic interference (EMI) that is due to high-frequency harmonics associated with hard switching. An important consequence of these advantages is that soft-switching resonant and semi-resonant converters can run at much higher efficiencies than their corresponding hard-switching counterparts.

The time interval of the half-cycle sinusoidally-shaped current flowing through an SR switch within a semi-resonant converter determines when the SR switch should be disabled. In order to achieve the desired zero current switching (ZCS), the SR switch should be disabled when this current has returned to zero. The reactive components of the semi-resonant converter determine this time interval. While this time interval may be calculated based upon the inductive and capacitive elements in the circuit, such a calculated time interval will not be perfect due to variations in the reactive elements. More particularly, inductor and capacitor components vary from one to another (as indicated by the tolerance typically assigned to such components), the inherent (parasitic) reactance of the circuit introduces variation, and temperature changes can alter the reactance of some components.

In order to minimize voltage and current ripple at the output of a voltage converter and to scale up its power output, a voltage converter may make use of multiple phases. The phases are each, effectively, separate voltage converters wherein each is tied to a common input voltage source and powers a common output load. To maintain stability and minimize the ripple, the phases should be driven by a common switching frequency, but with the switch control signals to each of the phases staggered in time.

A problem with multi-phase semi-resonant converters is that the time interval of the half-cycle sinusoidally-shaped current will vary from one phase to another due to variations in the inductance and capacitance within each of the phases. A controller using a common (but variable) switching frequency for all of the phases, and staggered versions of a control signal to drive the SR switches for each phase of a semi-resonant converter, will not achieve the ideal zero-current switching (ZCS) described earlier. More particularly, the time interval of the half-cycle sinusoidally-shaped current for some phases of the semi-resonant voltage converter may be relatively short whereas others may be relatively long. This means the controller may disable SR switches for some phases while positive current is still flowing through the SR switches, and may disable other SR switches when negative current is flowing through these SR switches.

In addition to the power loss and EMI associated with switching at a non-zero current, switching an SR switch when negative current is flowing through it may potentially damage the SR switch. Furthermore, negative current flow through an SR switch, as associated with not disabling an SR switch until after negative current is flowing through it, leads to additional power loss as compared with disabling an SR switch while positive current is flowing through it. This is because negative current flow through an SR switch partially discharges the output capacitor(s) of the voltage converter, effectively bleeding energy stored on the capacitor(s) to ground. Disabling the SR switches while positive current is flowing through them does not lead to such discharging of the output capacitor(s) and the associated wasted energy.

Accordingly, there is a need for improved techniques that avoid switching SR switches off in a multi-stage semi-resonant converter when the current flowing through the SR switches is negative.

SUMMARY

According to an embodiment of a multi-phase voltage converter, the voltage converter comprises a plurality of phases and a control circuit. Each of the phases includes a high-side switch that is connected to a low-side switch at a switching node. The high-side switches are connected to an input voltage terminal that supplies power to the converter, and the low sides are connected to ground. Each of the phases further includes a passive circuit that connects the switching node to a common output node of the voltage converter, in order to supply power to a load. Each of the passive circuits is connected to ground by a synchronous rectification (SR) switch through which a half-cycle sinusoidal-like current flows when the SR switch is turned on.

The control circuit is operable to identify a master phase, from among the phases of the voltage converter, that has an SR switch through which the half-cycle sinusoidal-like current returns to zero the quickest. The control circuit then aligns the phases for each switching cycle based on a switching period of the master phase, such that none of the SR switches turn off at a negative current level.

According to an embodiment of a method, a method is provided for aligning the phases in a multi-stage voltage converter. Each phase of the voltage converter includes a high-side switch connected between an input voltage terminal and a switching node, and a low-side switch connected between the switching node and ground. Each phase also includes a passive circuit that connects the switching node to a common output node of the voltage converter, and a synchronous rectification (SR) switch that connects the passive circuit to ground. A half-cycle sinusoidal-like current flows through the SR switch when it is conducting. The method begins by identifying a master phase, from the phases of the voltage converter, that has the SR switch through which the half-cycle sinusoidal-like current returns to zero the quickest. Based upon the switching period of this master phase, the phases of the voltage converter are aligned during each switching cycle such that none of the SR switches turn off at a negative current level.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Embodiments described herein provide techniques for aligning the switch timing of power switches within each of the phases in a multi-phase voltage converter, such that synchronous rectification (SR) switches in each phase are not turned off when negative current is flowing through them. The SR switches are included in a power converter topology that includes a transformer/center-tapped inductor (hereinafter referred to simply as a center-tapped inductor), and are used for coupling the center-tapped inductor to ground. Such a topology allows for high voltage-conversion ratios without requiring isolation. Because of its ability to support high voltage-conversion ratios, this topology is particularly appropriate for applications requiring an output power supply that provides a relatively low voltage and a relatively high current. This translates into relatively high current levels flowing through the SR switches including, potentially, negative currents. Such negative currents, particularly if they have a large magnitude, may damage the SR switches. Additionally, such negative currents discharge the capacitor(s) at the output of the voltage converter, thereby leading to reduced efficiency. Hence, negative current flows through the SR switches should be avoided. The techniques described below ensure that the SR switches are turned off when the current flowing through them is zero or positive.

Various embodiments of multi-phase voltage converter circuits and methods within multi-phase voltage converters will be provided in the following detailed description and the associated figures. The described embodiments provide particular examples for purposes of explanation, and are not meant to be limiting. Features and aspects from the example embodiments may be combined or re-arranged except where the context does not allow this.

Figure 1:
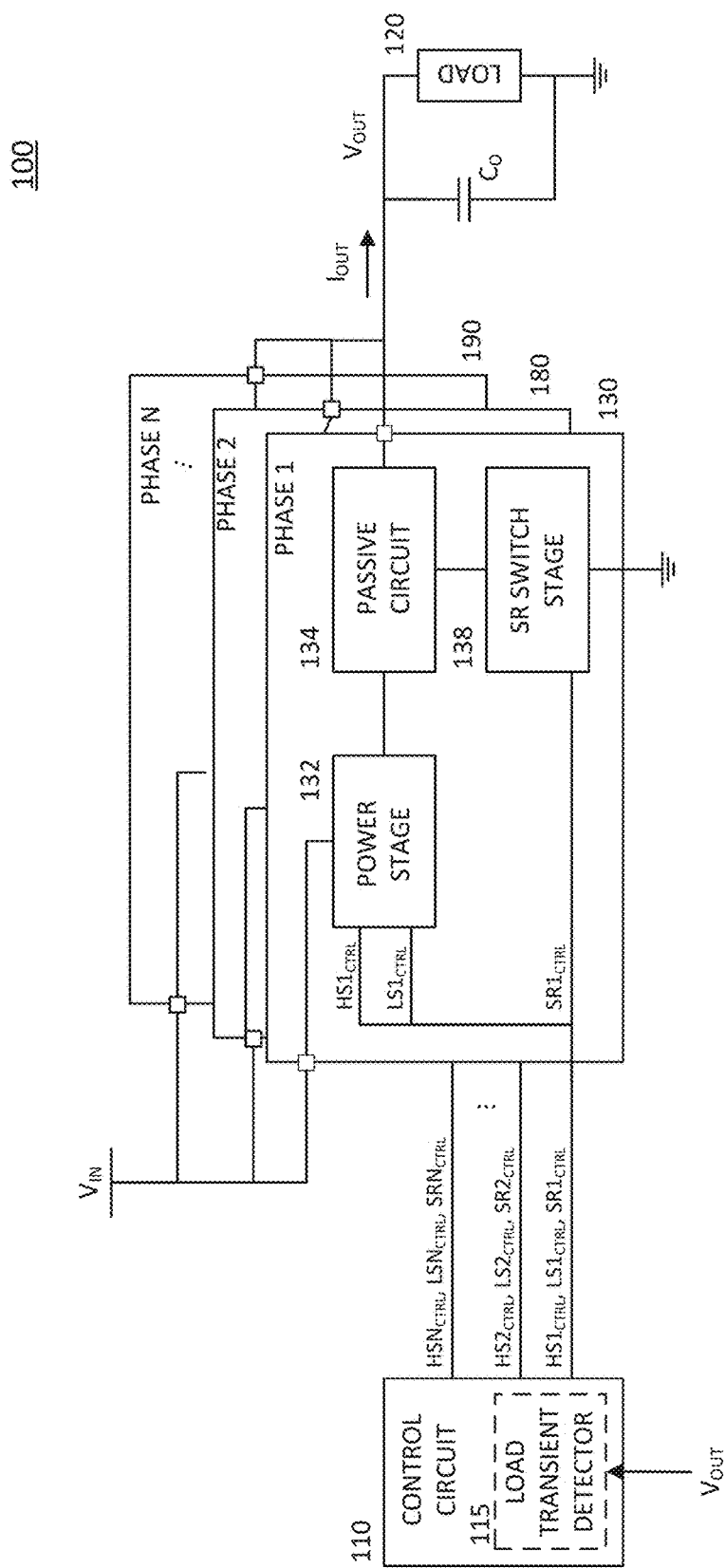
FIG. 1 illustrates a block diagram of an embodiment of a multi-phase voltage converter including a control circuit, wherein each phase includes a power stage, a passive circuit, and a synchronous rectification (SR) switch stage.

FIG. 1 illustrates an embodiment of a multi-stage voltage converter 100 that is configured to input power from a power source $V_{IN}$ and output power for driving a load 120. The voltage converter 100 supplies a current $I_{OUT}$ to the load 120 and to a capacitor $C_O$ that serves to filter an output voltage $V_{OUT}$. The voltage converter of FIG. 1 includes multiple phases 130, 180, 190. Phase 1 (130), which is taken as representative of the multiple phases, is illustrated in block diagram form with the understanding that the other phases would be similarly configured.

As illustrated, phase 1 (130) includes a passive circuit 134 that couples a powerstage 132 to the voltage converter output $V_{OUT}$. The power stage 132 inputs switch control signals $HS1_{CTRL}$ and $LS1_{CTRL}$ for controlling switches therein. The switches within the power stage 132 typically require drivers (not shown for ease of illustration). The passive circuit 134 is coupled to a synchronous rectification (SR) switch stage 138, which serves to switchably couple the passive circuit 134 to ground. The SR switch stage 138 includes an SR switch (not shown), which also typically requires a driver (not shown for ease of illustration).

A control circuit 110 controls the switches of the power stage and the SR switch stage for each of the phases of the voltage converter 100. The control circuit 110 determines a switching frequency for the voltage converter based upon the load requirements, and drives switch control signals (e.g., $HS1_{CTRL}$, $LS1_{CTRL}$, $SR1_{CTRL}$) for each of the phases of the voltage converter 100. These control signals are typically pulse-width-modulated (PWM) waveforms, each of which is driven with a frequency and duty cycle determined by the control circuit 110 based upon the requirements of the load 120. The control circuit 110 includes a load transient detector 115, which will typically input the output voltage $V_{OUT}$ or a measurement thereof, for purposes of detecting load transients. The switching frequency is variable and changes as the load requirements change.

The control circuit 110 may be implemented using analog hardware components (such as transistors, amplifiers, diodes, and resistors), may be implemented using processor circuitry including primarily digital components, or may be implemented using a combination of analog hardware components and processor circuitry. The processor circuitry may include one or more of a digital signal processor (DSP), a general-purpose processor, and an application-specific integrated circuit (ASIC). The control circuit 110 may also include memory, e.g., non-volatile memory such as flash, that includes instructions or data for use by processor circuitry. The control circuit 110 inputs several sensor signals (e.g., $I_{OUT}$, $V_{OUT}$, current measurements for the SR switch stages of each phase) to estimate the power requirements for the load 120 and to otherwise aid in the generation of the switch control signals.

In order to maintain stability and reduce ripple at the output of the voltage converter 100, the multiple phases of the voltage converter are typically driven using the same switching frequency during a switch cycle of the voltage converter 100. The control circuit 110 determines the load requirements at a given point in time. Based upon these load requirements and, possibly, the switching frequency for the current cycle, the control circuit 110 will determine a switching frequency (and associated time period) for an upcoming (next) cycle. For a given phase of the voltage converter, this upcoming switch frequency (and associated time period) is used to generate the PWM waveforms for each of the switches in the given phase (e.g., $HS1_{CTRL}$, $LS1_{CTRL}$, $SR1_{CTRL}$) for the upcoming switch cycle. Versions of these PWM waveforms that are delayed (staggered) in time are used to drive the switches in the other phases of the voltage converter for the upcoming switch cycle. The control circuit 110 repeats this process for each switch cycle. To further explain this timing, a circuit implementation for a single phase, e.g., phase 1 (130), of the voltage converter 100 will now be described followed by a description of the switch timing used in the single phase. This description will then be extrapolated to multiple phases of the voltage converter 100.

Techniques for determining the switching frequency and duty cycles based upon the load requirements of a voltage converter are, generally, well-known in the art. Such conventional techniques will not be further elaborated upon herein, in order to avoid obfuscating the unique aspects of the invention, which are described.

Figure 2:
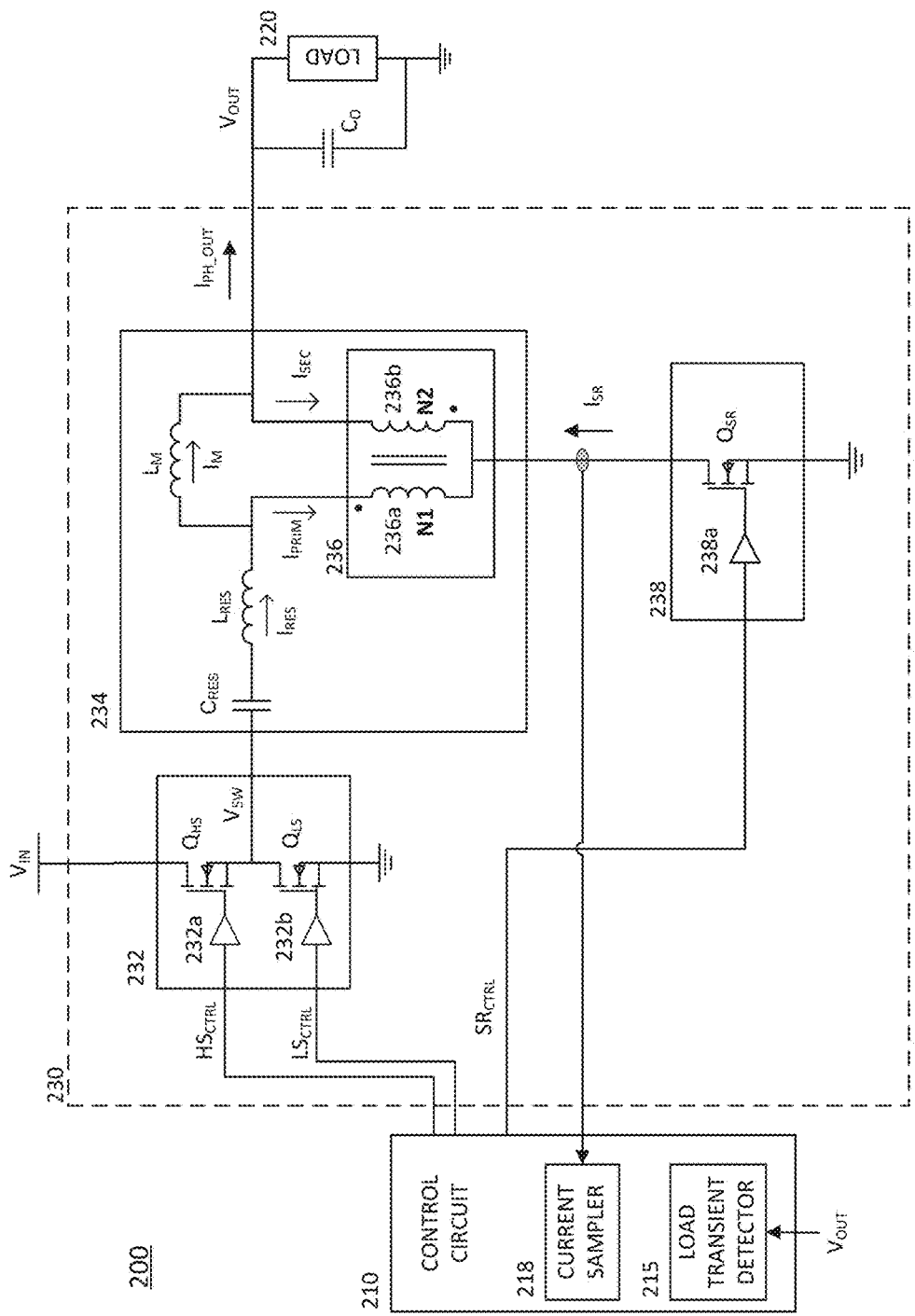
FIG. 2 illustrates a circuit diagram of an embodiment for one phase of a voltage converter such as that illustrated in FIG. 1.

FIG. 2 illustrates a circuit diagram 200 that shows one phase 230 of a voltage converter such as that shown in FIG. 1. The phase circuit 230 is replicated to realize a multi-phase voltage converter such as that of FIG. 1. For ease of illustration, such other phases are not shown in FIG. 2, but it is understood that they exist in a multi-stage voltage converter and that their circuitry is similar or equivalent to the phase circuit 230 that is shown.

An input voltage $V_{IN}$ is input to a power stage 232 at a high-side switch $Q_{HS}$ that is coupled to a low-side switch $Q_{LS}$ at a switching node $V_{SW}$. The low-side switch $Q_{LS}$ is, in turn, connected to ground. Each of these switches $Q_{HS}$, $Q_{LS}$ is controlled by a respective driver 232a, 232b as shown. The switching node $V_{SW}$ of the power stage 232 is coupled to a passive circuit 234, which provides an output current $I_{PH\_OUT}$ and voltage $V_{OUT}$ to a load 220. The passive circuit 234 includes a resonant tank comprised of a capacitor $C_{RES}$ and an inductor $L_{RES}$. The inductor $L_{RES}$ may merely be the leakage inductance (e.g., the inherent parasitic inductance of the circuit wiring), or it may be an actual inductor component together with the leakage inductance. Moreover, the inductance represented by $L_{RES}$ is typically variable, because the inductance value will often vary over temperature. The inductor $L_{RES}$ is coupled to a transformer/center-tapped inductor 236 having N1 primary-side windings 236a and N2 secondary-side windings 236b. The turns ratio N2/N1 determines the output/input voltage ratio of the center-tapped inductor 236 when it is conducting current, (Conversely, the ratio N1/N2 determines the output/input current ratio of the center-tapped inductor 236.) For the illustrated circuit, a magnetizing inductor $L_A$ is connected across the center-tapped inductor 236. An SR switch stage 238 is connected to the center-tapped inductor 236 and serves to couple its center tap to ground when the SR switch stage 238 is conducting. The SR switch stage 238 includes an SR switch $Q_{SR}$, and, typically, a driver 238a that is coupled to a control terminal (e.g., a gate) of the SR switch $Q_{SR}$.

The high-side, low-side, and SR switches $Q_{HS}$, $Q_{LS}$, $Q_{SR}$ are shown in FIG. 2 as enhancement-mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches of the power stage 232 and of the SR switch stage 238 (e.g., $Q_{HS}$, $Q_{LS}$, $Q_{SR}$) may be integrated on the same semiconductor die, may each be provided on separate dies, or may otherwise be spread across a plurality of semiconductor dies. The drivers for the switches may be integrated on the same semiconductor die(s) as their corresponding switches, or may be provided on separate dies.

A control circuit 210 generates PWM signals $HS_{CTRL}$, $LS_{CTRL}$, and $SR_{CTRL}$ that are coupled to the drivers 232a, 232b, 238a that control the switches $Q_{HS}$, $Q_{LS}$, $Q_{SR}$ in the circuit 230 for the illustrated phase. The control circuit 210 determines the frequency and duty cycle of the PWM signals $HS_{CTRL}$, $LS_{CTRL}$, $SR_{CTRL}$ so as to meet the power requirements of the load 220. In a semi-resonant voltage converter such as that illustrated in FIG. 2, the high-side and low-side switches $Q_{HS}$, $Q_{LS}$ of the power stage 232 are controlled such that these switches do not conduct at the same time. A typical switching cycle of the voltage converter phase 230 begins with a "dead time" during which none of the switches $Q_{HS}$, $Q_{LS}$ $Q_{SR}$ are conducting. This is followed by a "$T_{ON}$" period during which the high-side switch $Q_{HS}$ is conducting, but the low-side switch $Q_{LS}$ and the SR switch $Q_{SR}$ are not conducting. A "$T_{OFF}$" period follows this, during which the high-side switch $Q_{HS}$ is not conducting, but the low-side switch $Q_{LS}$ and the SR switch $Q_{SR}$ are conducting, The control circuit 210 includes a load transient detector 215 that functions similarly to the load transient detector 115 of FIG. 1. Additionally, the control circuit 210 inputs a measurement of the current for the SR switch $Q_{SR}$ using a current sampler 218.

Figure 3:
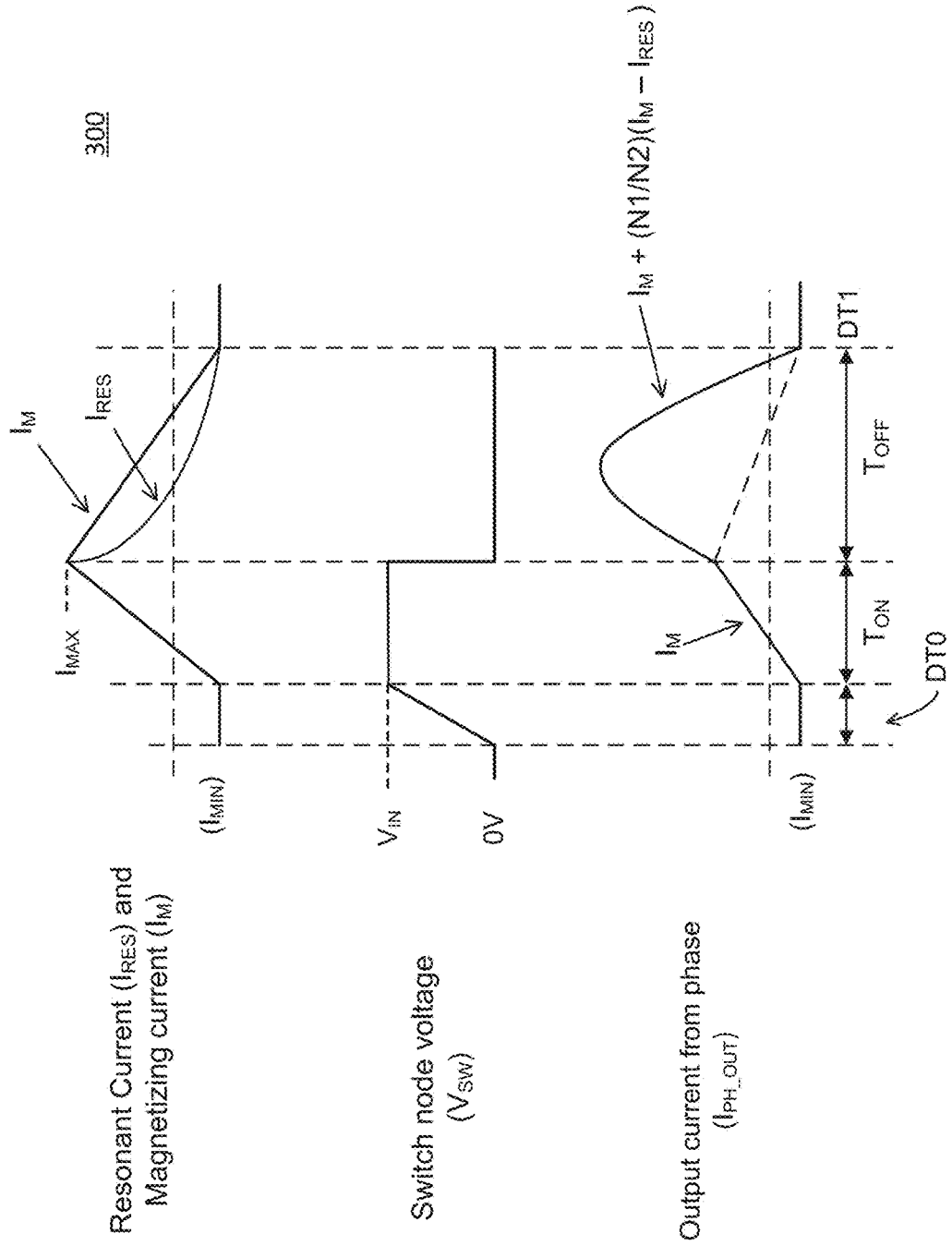
FIG. 3 illustrates voltage and current waveforms as might be generated in one phase of a semi-resonant voltage converter such as that shown in FIG. 1.

FIG. 3 illustrates waveforms 300 for the output current $I_{PH\_OUT}$ from the phase circuit 230, the voltage at the switch node $V_{SW}$, and the resonant and magnetizing currents $I_{RES}$, $I_M$ of the voltage converter 200 during a switch cycle. At the start of a dead time period DT0, the phase output current $I_{PH\_OUT}$ and the magnetizing current $I_M$ are at a minimum value $I_{MIN}$, which is negative. None of the power switches $Q_{HS}$, $Q_{LS}$, $Q_{SR}$ are conducting during the dead time DT0, i.e., the control circuit 210 generates PWM signals $HS_{CTRL}=0$, $LS_{CTRL}=0$, $SR_{CTRL}=0$. The negative current $I_{MIN}$ charges the output capacitance of the low-side switch $Q_{LS}$ and causes the switch node voltage $V_{SW}$ to rise to a level near $V_{IN}$ during the dead time DT0. At the end of the dead time DT0, the high-side power switch $Q_{HS}$ is turned on whereas the low-side switch $Q_{LS}$ and SR switch $Q_{SR}$ remain off, e.g., by setting $HS_{CTRL}=1$, $LS_{CTRL}=0$, and $SR_{CTRL}=0$ at the end of DT0. This state is maintained for an interval of time denoted "$T_{ON}$." During $T_{ON}$, the switch node voltage $V_{SW}$ is tied to $V_{IN}$ through the high-side power switch $Q_{HS}$, and the phase output current $I_{PH\_OUT}$ and the magnetizing current $I_M$ of the voltage converter phase 230 rise in a linear manner, e.g., until the magnetizing current $I_M$ reaches a maximum value $I_{MAX}$. The magnetizing current $I_M$ associated with the LC tank formed by the resonance capacitor $C_{RES}$, the inductor $L_{RES}$ and the magnetizing inductor $L_M$ accounts for the rise in the phase output current $I_{PH\_OUT}$ during $T_{ON}$. (With the SR switch $Q_{SR}$ disabled, almost no current flows through the center-tapped inductor 236 meaning that magnetizing current $I_M \approx I_{RES}$.)

During the next interval of the switching cycle, denoted as "$T_{OFF}$," the high-side switch $Q_{HS}$ is turned off, while the low-side switch $Q_{LS}$ and the SR switch $Q_{SR}$ are turned on, e.g., by setting $HS_{CTRL}=0$, $LS_{CTRL}=1$ and $SR_{CTRL}=1$. The switch node voltage $V_{sw}$ drops to and remains at zero during the $T_{OFF}$ interval, because the switch node $V_{SW}$ is coupled to ground though the low-side switch $Q_{LS}$. Also during the $T_{OFF}$ interval, a resonance is formed between resonance capacitor $C_{RES}$ and inductor $L_{RES}$, and results in a resonant current $I_{RES}$. A portion of this current, i.e., $I_{PRIM}=I_{RES}-I_M$, flows through into the primary-side winding 236a of the center-tapped inductor 236, and leads to a current $I_{SEC}=(N1/N2)*(I_{RES}-I_M)$ flowing through the secondary-side winding 236b of the center-tapped inductor 236. The output current $I_{PH\_OUT}$ of the phase 230 is, thus, the current $I_M$ flowing through the magnetizing inductor $L_M$ minus the current $I_{SEC}$ flowing through the secondary-side winding 236b, i.e., $I_{PH\_OUT}=I_M-(N1/N2)*(I_{RES}-I_M)=I_M+(N1/N2)*(I_M-I_{RES})$. If the interval $T_{OFF}$ is optimized with respect to the resonant frequency, the SR switch $Q_{SR}$ can be turned off when its current is substantially zero in order to achieve soft-switching of the SR switch $Q_{SR}$.

The current $I_{PH\_OUT}$ that is output by the voltage converter phase 230 initially rises during $T_{OFF}$, as given by $I_{PH\_OUT}=I_M+(N1/N2)(I_M-I_{RES})$, and subsequently falls. This current takes on the shape of the positive half of a sinusoidal cycle. The time instant at which $I_{RES}$ and $I_M$ are equal represents the point at which current stops flowing through the center-tapped inductor 236, i.e., all of the current $I_{RES}$ is flowing through the magnetizing inductor $L_M$. With no current flowing through the primary-side winding 236a of the center-tapped inductor, no current is induced on the secondary-side winding 236b and, hence, no current flows through the SR switch $Q_{SR}$. Ideally, both the low-side switch $Q_{LS}$ and the SR switch $Q_{SR}$ are turned off at this instant, and the dead time DT1 for the next cycle begins, i.e., the switches $Q_{HS}$, $Q_{LS}$, $Q_{SR}$ are all disabled by setting $HS_{CTRL}=0$, $LS_{CTRL}=0$, and $SR_{CTRL}=0$.

Figure 4:
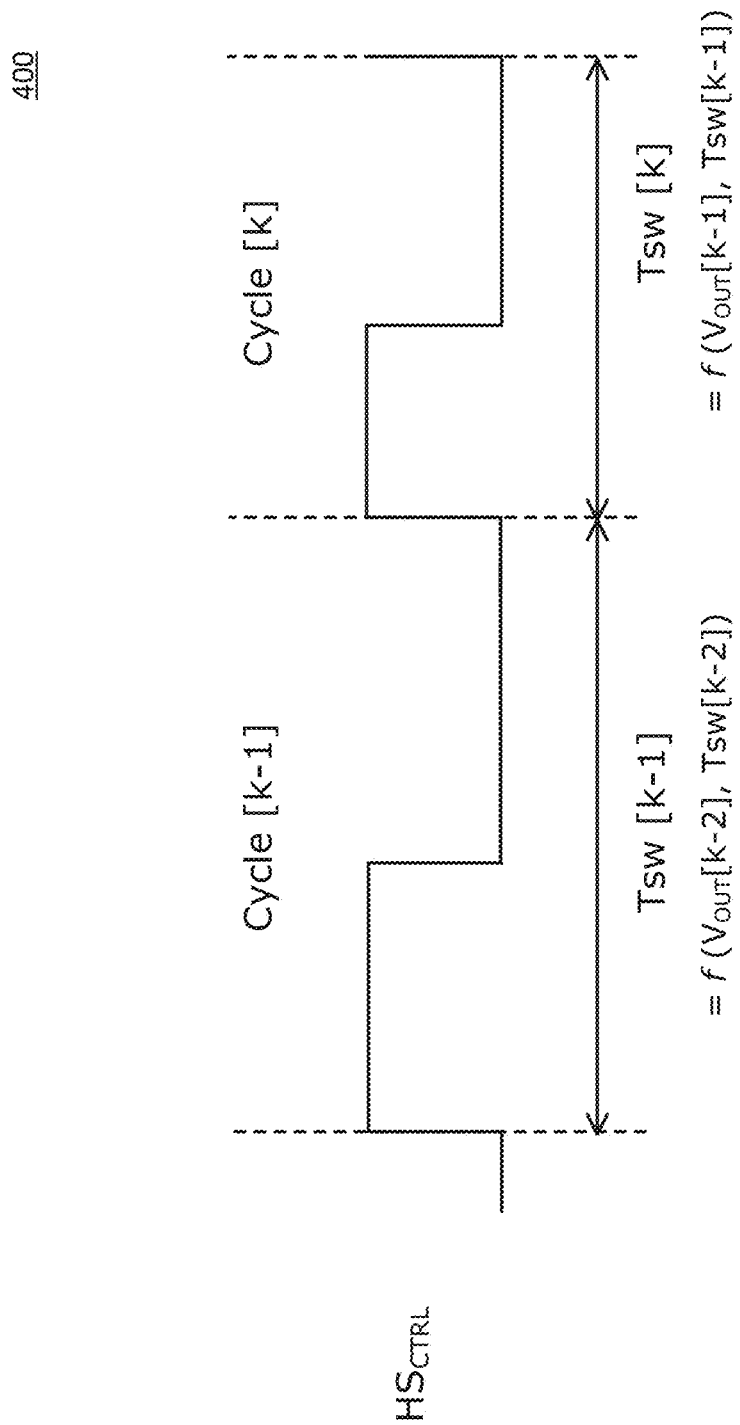
FIG. 4 illustrates a pulse-width-modulated (PWM) waveform as might be used to control a high-side control switch in a variable-frequency voltage converter such as that shown in FIG. 1.

FIG. 4 illustrates a waveform 400 corresponding to the timing of the control signal $HS_{CTRL}$ for a high-side switch $Q_{HS}$ such as that shown in FIG. 2. The voltage converter 200 of FIG. 2, and the control circuit 210 therein, use a variable switching frequency to accommodate variations in the power requirements of the load 220. For a given switch cycle k of the voltage converter 200, the control circuit 210 determines a switching period Tsw[k] based upon measurements taken in the previous cycle (k−1). The measurements estimate the load's power requirements by measuring or estimating, e.g., the output voltage $V_{PUT}$ of the voltage converter 200, For example and as shown in FIG. 4, the switching period Tsw[k] may be a function of an output voltage $V_{OUT}$ that is measured in cycle (k−1). The switching period Tsw[k] for the current switch cycle may also be based upon the switching period Tsw[k−1] of the previous switch cycle, i.e., the switch period Tsw[k] for the current cycle may be determined by adjusting the switch period Tsw[k−1] from the previous switch cycle (k−1).

Figure 5:
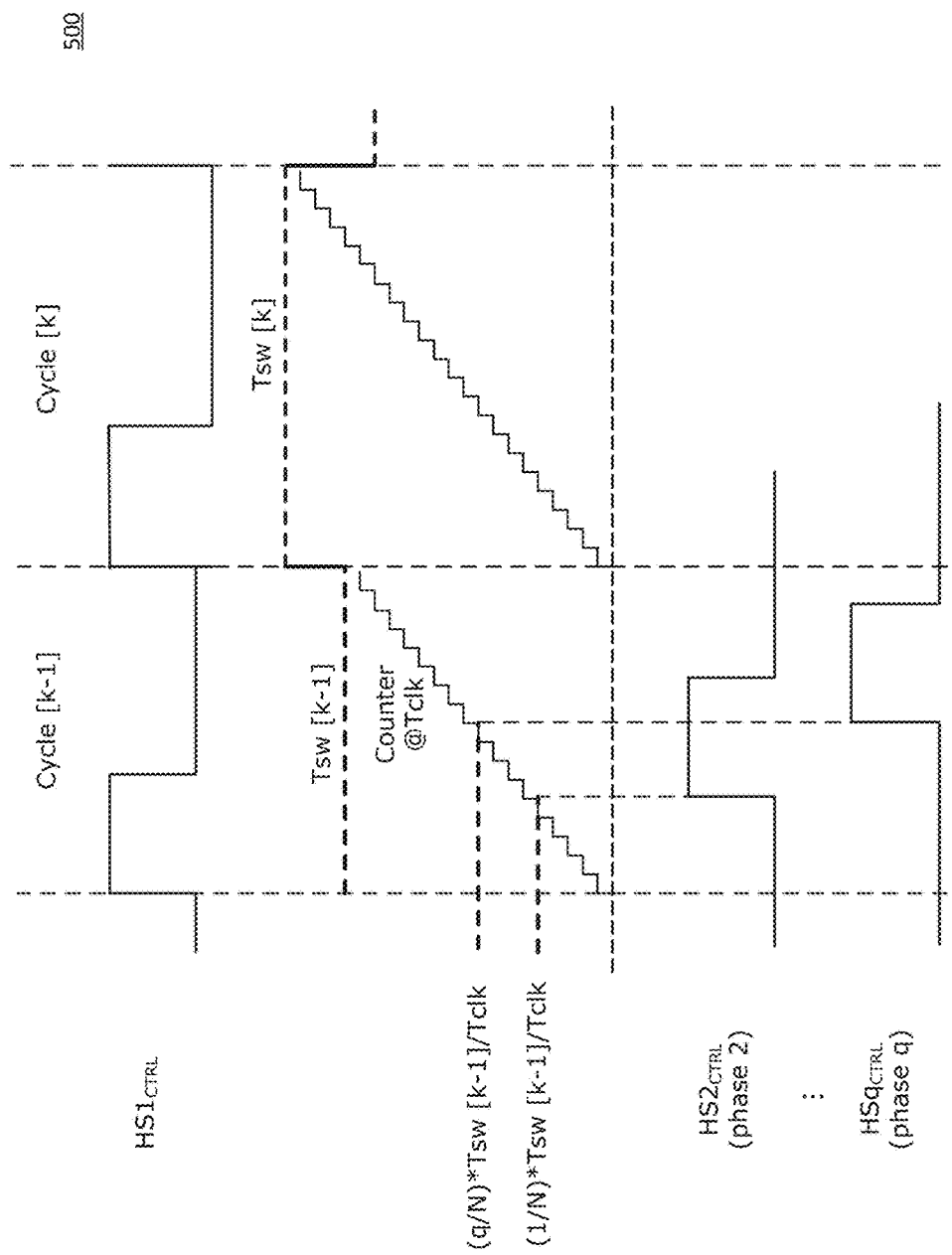
FIG. 5 illustrates PWM waveforms for controlling the high-side switch in each of multiple phases of a voltage converter such as that of FIG. 1.

FIG. 5 illustrates an extrapolation of the waveform of FIG. 4, which only considers the control signal for a single phase, for multiple phases of a multi-phase voltage converter. FIG. 5 illustrates waveforms 500 corresponding to high-side control signals $HS1_{CTRL}$, $HS2_{CTRL}$, ... $HSq_{CTRL}$ for multiple phases of an N-phase voltage converter such as the voltage converter 100 of FIG. 1. As similarly described regarding the waveform of FIG. 4, a cycle period Tsw, together with a "$T_{ON}$" interval, are determined for a cycle (k−1) based upon measurements during cycle (k−2). This is illustrated by the PWM waveform $HS1_{CTRL}$, which represents the control signal for a high-side switch $Q_{HS}$ included as part of the first phase in the multi-phase voltage converter 100. This first phase may be considered as a "leading" phase, in that the timings for the other phases are driven from this phase. For a typical implementation, the start times for the other (non-leading) phases are evenly distributed throughout the cycle period Tsw[k−1]. Consider, for example, an example in which the voltage converter 100 has three (3) phases, and a cycle of the first (leading) phase begins at time to and has a cycle period of Tsw[k−1]. Then, the control signal $HS1_{CTRL}$ for the first phase would rise at time to, the control signal $HS2_{CTRL}$ for the second phase would rise at time $t_0+(1/3)*Tsw[k-1]$, and the control signal $HS3_{CTRL}$ for the third phase would rise at time $t_0+(2/3)*Tsw[k-1]$. The other control signals, e.g., for controlling low-side and SR switches, for the non-leading phases, would likewise be delayed versions of the control signals for the leading phase.

A counter having a clock period of Tclk is used to implement the cycle period Tsw[k−1], and to determine the transition times for the PWM control signals, e.g., $HS_{CTRL}$, $LS_{CTRL}$, $SR_{CTRL}$, for each of the phases in the multi-phase voltage converter 100. For the second phase of the N-phase voltage converter 100, the control signal $HS2_{CTRL}$ thus rises when the counter equals (1/N)*Tsw[k−1]/Tclk clock periods after the beginning of the switch cycle (k−1). For a $q^{th}$ phase, a control signal $HS_{CTRK}$ rises when the counter equals ((q-1)/N)*Tsw[k−1]/Tclk clock periods after the beginning of the switch cycle (k−1). As described thus far, the switch cycle periods Tsw[k−1] are the same for all of the phases (leading and non-leading), but it is possible that the cycle period could by adjusted for the non-leading phases. This may not preferred due to the additional complexity, the limited advantage of this, and the potential for creating additional ripple in the output voltage and/or current.

Figure 6:
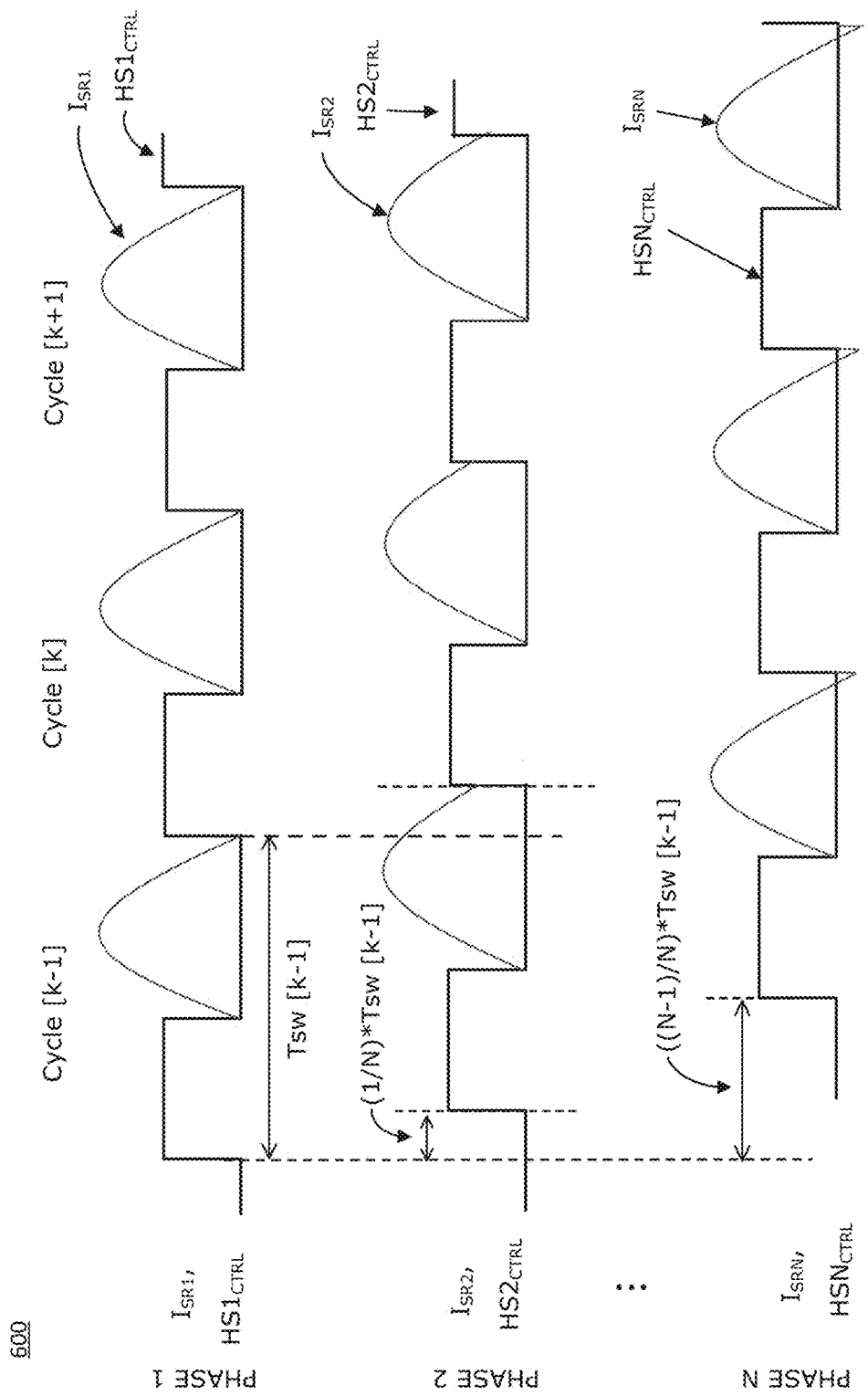
FIG. 6 illustrates PWM waveforms for controlling the high-side switches for each of multiple phases, and waveforms for the current through SR switches for each of multiple phases in a voltage converter such as that of FIG. 1.

FIG. 6 illustrates waveforms 600 associated with an N-phase voltage converter such as that shown in FIG. 1. Waveforms are illustrated for the PWM high-side control signals $HS1_{CTRL}$, $HS2_{CTRL}$, . . . $HSN_{CTRL}$ of each phase. Superimposed on these are waveforms corresponding to the currents $I_{SR1}$, $I_{SR2}$, . . . $I_{SRN}$ flowing through the SR switches $Q_{SR}$ for each of the phases. As similarly explained regarding FIG. 5, the high-side control signals $HS1_{CTRL}$, $HS2_{CTRL}$, . . . $HSN_{CTRL}$ are staggered such that the signals corresponding to the non-leading phases (phases 2 to N) are delayed versions of the signal for the leading phase (phase 1). This is illustrated for phase 2, wherein the high-side control signal $HS2_{CTRL}$ for cycle (k−1) has a rising edge that is (1/N)*Tsw[k−1] later in time than the rising edge for the high-side control signal $HS1_{CTRL}$ for cycle (k−1). Similarly for phase N (the last phase), the high-side control signal $HSN_{CTRL}$ for cycle (k−1) has a rising edge that is ((N-1)/N)*Tsw[k−1] later than the rising edge for the high-side control signal $HS1_{CTRL}$ for cycle (k−1). The waveforms 600 of FIG. 6 presume that the switching period for a given cycle, e.g., Tsw[k−1], has been calculated in the preceding cycle, e.g., k−2, and that this switch period may be used both as the switch period and to determine the stagger (delay) times for starting the cycles of the non-leading phases. For ease of explanation, the switch periods illustrated in FIG. 6 do not change for the three (3) illustrated cycles k−1, k, k+1.

For a given phase, current flows through its SR switch, e.g., $Q_{SR}$, when the SR switch is conducting. The PWM control signal $SR_{CTRL}$ for an SR switch $Q_{SR}$ determines when that SR switch conducts. As explained in the description of FIG. 3, the PWM control signal $SR_{CTRL}$ only enables its corresponding SR switch during the off interval ("$T_{OFF}$") of the high-side switch QHs for the phase. In FIG. 6, this corresponds to the time interval when a high-side control signal, e.g., $HS1_{CTRL}$, is low.

The currents flowing through the SR switches take on the shape of the upper half cycle of a sinusoid. This is readily seen in FIG. 6 for the current $I_{SR1}$ that flows through the SR switch $Q_{SR}$ for phase 1 of the voltage converter 100. For each cycle (e.g., k−1, k), the half-cycle sinusoidally-shaped current returns to zero at the beginning of the dead-time interval that immediately precedes the rising edge of the high-side PWM control signal $HS1_{CTRL}$. The rising edge of the high-side PWM control signal $HS1_{CTRL}$ signifies the start of the next cycle (e.g., k, k+1) of the voltage converter 100. (For ease of illustration, the "dead time" is not shown in FIG. 6, but it is understood that the PWM control signal $SR1_{CTRL}$ would actually disable the current $I_{SR1}$ at the start of a dead time interval during which none of the switches are conducting.)

The control circuit 110 of the voltage converter 100 adjusts the PWM signal timings, e.g., $HS1_{CTRL}$, $LS1_{CTRL}$, $SR1_{CTRL}$, so that the SR switch $Q_{SR}$ of phase 1 is turned off at approximately the time when the current $I_{SR1}$ flowing through this SR switch $Q_{SR}$ is zero. The control circuit 110 may determine these timings using a measurement/estimation of the current $I_{SR1}$ as input to the current sampler 218 illustrated in FIG. 2. The current $I_{SR1}$ may be measured by using the effective on-state resistance ($R_{dson}$) of the SR switch $Q_{SR}$ and the voltage across the SR switch $Q_{SR}$, or by using a current mirror. The current measurement, for $I_{SR1}$ or otherwise, may also be accomplished by using other standard means such as measuring the voltage across a sensing resistor, or by using direct current sensing (DCR) techniques.

The interval during which the half-cycle sinusoidal current $I_{SR1}$ is positive is determined by the components in the passive circuit 234 of the circuit 230 for phase 1 of the voltage converter 200, e.g., the values of the LC resonant tank given by $C_{RES}$, $L_{RFS}$, the value of the magnetizing inductor $L_M$, and the inductance of the center-tapped inductor 236. Stated alternatively, the components of the passive circuit 234 have a resonant (natural) frequency that determines the time interval corresponding to the positive half-cycle sinusoidal current $I_{SR1}$. While this time interval may be calculated based on the component values, the component values will vary from circuit-to-circuit and, additionally, will vary according to the operating conditions (e.g., temperature) of the voltage converter 100. Hence, an empirical technique that makes use of a measurement of $I_{SR1}$, as described above, is preferred.

Consider, now, the passive circuits (corresponding to the passive circuit 134 of phase 1) for the other phases (e.g., phases 2 to N) of the voltage converter 100. The reactance in the passive circuits for these other phases will differ from those of phase 1, and, hence, will have different resonant (natural) frequencies than the passive circuit 134 of phase 1. This means that the time interval for the half-cycle sinusoidal currents $I_{SR2}$, . . . $I_{SRN}$ will differ from the time interval for $I_{SR1}$. This is shown in FIG. 6 where the time interval for the half-cycle sinusoid corresponding to the current $I_{SR2}$ through the SR switch $Q_{SR}$ for phase 2 is longer (slower) than that of phase 1. With the high-side control signal $HS2_{CTRL}$ of phase 2 being a delayed version of the high-side control signal $HS1_{CTRL}$ of phase 1, i.e., having the same $T_{ON}$ and $T_{OFF}$ intervals, this means that the control signal $SR2_{CTRL}$ turns off the SR switch $Q_{SR}$ for phase 2 while positive current $I_{SR2}$ is still being conducted. This is illustrated in FIG. 6 for each of the shown cycles k−1, k, k+1.

For phase N, the interval for the half-cycle sinusoid corresponding to the current $I_{SRN}$ through the SR switch $Q_{SR}$ is shorter (faster) than that of phase 1. Hence, the control signal $SRN_{CTRL}$ does not turn off the SR switch $Q_{SR}$ for phase N until after the current $I_{SR2}$ has crossed zero. This means that negative current is being conducted for the interval immediately before the SR switch $Q_{SR}$ for phase N is turned off, as shown in FIG. 6. As explained previously, it is undesirable to conduct negative current through any of the SR switches $Q_{SR}$, e.g., in a direction opposite to the arrow shown in FIG. 2 for ISR.

By generating PWM control signals $HS_{CTRL}$, $LS_{CTRL}$, $SR_{CTRL}$, and measuring the current through the SR switches $Q_{SR}$ for each of the phases, the control circuit 110 is able to determine which of the phases are 'fast' and which are 'slow,' i.e., what the relative resonant frequencies of the different phases are. The control circuit 110 can then re-order (align) its control of the phases in order to avoid negative current flow through any of the SR switches $Q_{SR}$.

Figure 7:
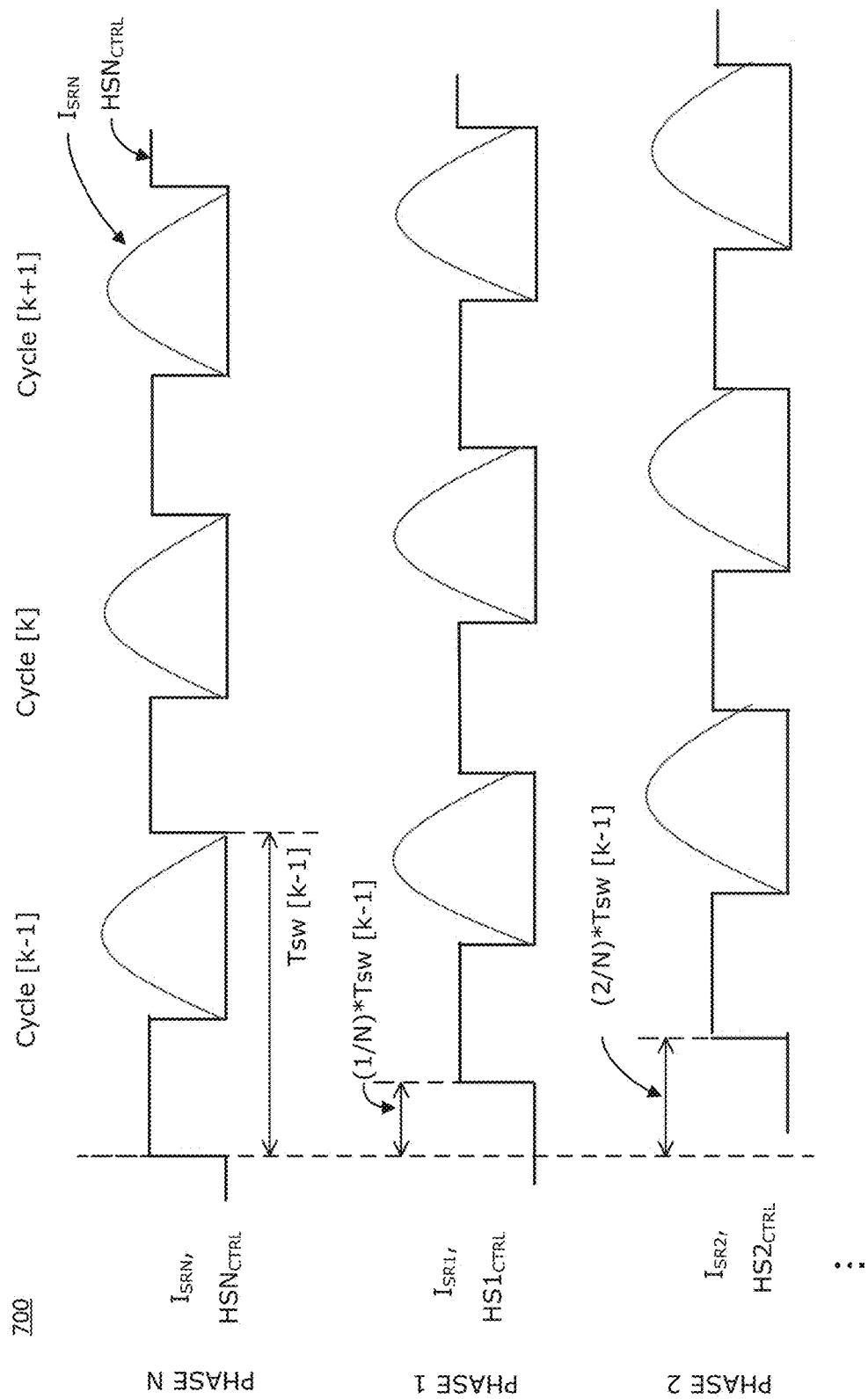
FIG. 7 illustrates PWM waveforms for controlling the high-side switches for each of multiple phases, and waveforms for the current through SR switches for each of multiple phases in a voltage converter such as that of FIG. 1 after the phases have been aligned to a master phase.

FIG. 7 illustrates waveforms 700 corresponding to the high-side PWM control signals $HS1_{CTRL}$, $HS2_{CTRL}$, . . . $HSN_{CTRL}$ and the currents $I_{SR1}$, $I_{SR2}$, . . . $I_{SRN}$ flowing through the SR switches $Q_{SR}$ for each of the phases, after the control circuit 110 has aligned (re-ordered) the phases. In one embodiment, the control circuit 110 performs a calibration for the voltage converter 100. This is done by running the voltage converter 100 using all of the phases to drive some load, wherein one phase (e.g., phase 1) is arbitrarily set as a leading phase for the voltage converter 100. In one sub-embodiment, the switching frequency is set to a fixed value for the calibration mode and is not dependent upon any load requirements. During the calibration mode for the first embodiment or its sub-embodiment, the control circuit 110 measures the currents $I_{SR1}$, $I_{SR2}$, . . . $I_{SRN}$ through the switches $Q_{SR}$ for each of the phases, and orders the phases from "fastest," i.e., the phase having the current $I_{SR}$ with the shortest half-cycle sinusoid interval, to the "slowest." The voltage converter 100 subsequently enters a normal operational mode during which the control circuit 110 uses the identified fastest phase as a master phase. The control circuit 110 generates PWM control signals $HS_{CTRL}$, $LS_{CTRL}$, $SR_{CTRL}$, for the master phase, and then generates corresponding delayed versions of these PWM control signals to drive the switches $Q_{SR}$ of the other (non-master) phases. Using the example waveforms illustrated in FIG. 6, phase N is indicated as being the fastest and, hence, would be chosen as the master phase. This is shown in FIG. 7, where the high-side PWM control signal $HSN_{CTRL}$ is illustrated as starting each of the cycles k−1, k, k+1. The PWM control signals for the other phases follow those of the master phase, (phase N). Because the non-master phases use the same duty cycles, e.g., $T_{ON}$, $T_{OFF}$, as the master phase and the time intervals for the half-cycle sinusoidal currents are longer for the non-master phases, the switches $Q_{SR}$ of the non-master phases are turned off before the currents $I_{SR1}$, . . . $I_{SR2}$ through them reach or go below zero. Hence, negative current flows through the switches $Q_{SR}$ are avoided.

As explained in the first embodiment above, the phase alignment (re-ordering) is performed in a calibration mode that precedes the normal operational mode of the voltage converter 100. In a second embodiment that may be an alternative to or in addition to the first embodiment, the control circuit 110 may align (or re-align) the phase timings after normal operational mode has begun. Such re-aligning may be advantageous when the reactance of the passive circuits 234, etc., varies considerably over time and/or operating condition. For example, inductance values often vary with temperature. The re-alignment may be performed at regular or irregular intervals, e.g., on a periodic basis or whenever the control circuit 110 detects some change in operating condition. Alternatively, the control circuit 110 may constantly monitor the currents $I_{SR1}$, $I_{SR2}$, . . . $I_{SRN}$ and whenever a new "fastest" phase is identified, then a re-alignment of the phase timings is performed using the newly-identified fastest phase as the master. In some implementations, it may be desired to only determine a new master phase when a new "fastest" phase is faster than the current master phase by a predetermined threshold. This will prevent excessive re-alignment of the phases which, in addition to added complexity in the control circuit 110, may lead to additional ripple in the output $V_{OUT}$ of the voltage converter 110.

Once the master phase is determined and the voltage converter 100 is running in normal operational mode, the control circuit 110 varies the switching period of the master phase from cycle-to-cycle. In order to implement the variable switching frequency, e.g., by adjusting the switch periods, $T_{ON}$ intervals, and $T_{OFF}$ intervals for the switch cycles, the control circuit is operable to increment a counter at a defined frequency over the reference period for the immediately preceding switching cycle and to align the phases based on the counter output and the number of phases.

The prior explanations described a voltage converter in which the switch period Tsw[k] for the master phase has already been determined at the beginning of a cycle k. This determined switch period can be used for setting the $T_{ON}$ and $T_{OFF}$ periods within cycle k, as well as for determining the start times for cycles of the non-master phases that follow the timing of the master (leading) phase. In order to more quickly react to load changes, a voltage converter may alter the switch period without waiting until the next start cycle of the master phase. More particularly, the switch period Tsw[k] may be adjusted for non-master phases in the middle of a cycle of the master phase. However, the start of a switch period (e.g., for cycle k) for a non-master phase is based upon the switch period from a previous cycle of the master phase, henceforth denoted as $Tsw_m$[k−1]. This will now be explained, by way of example, for a 2-phase voltage converter having waveforms as illustrated in FIG. 8.

Figure 8:
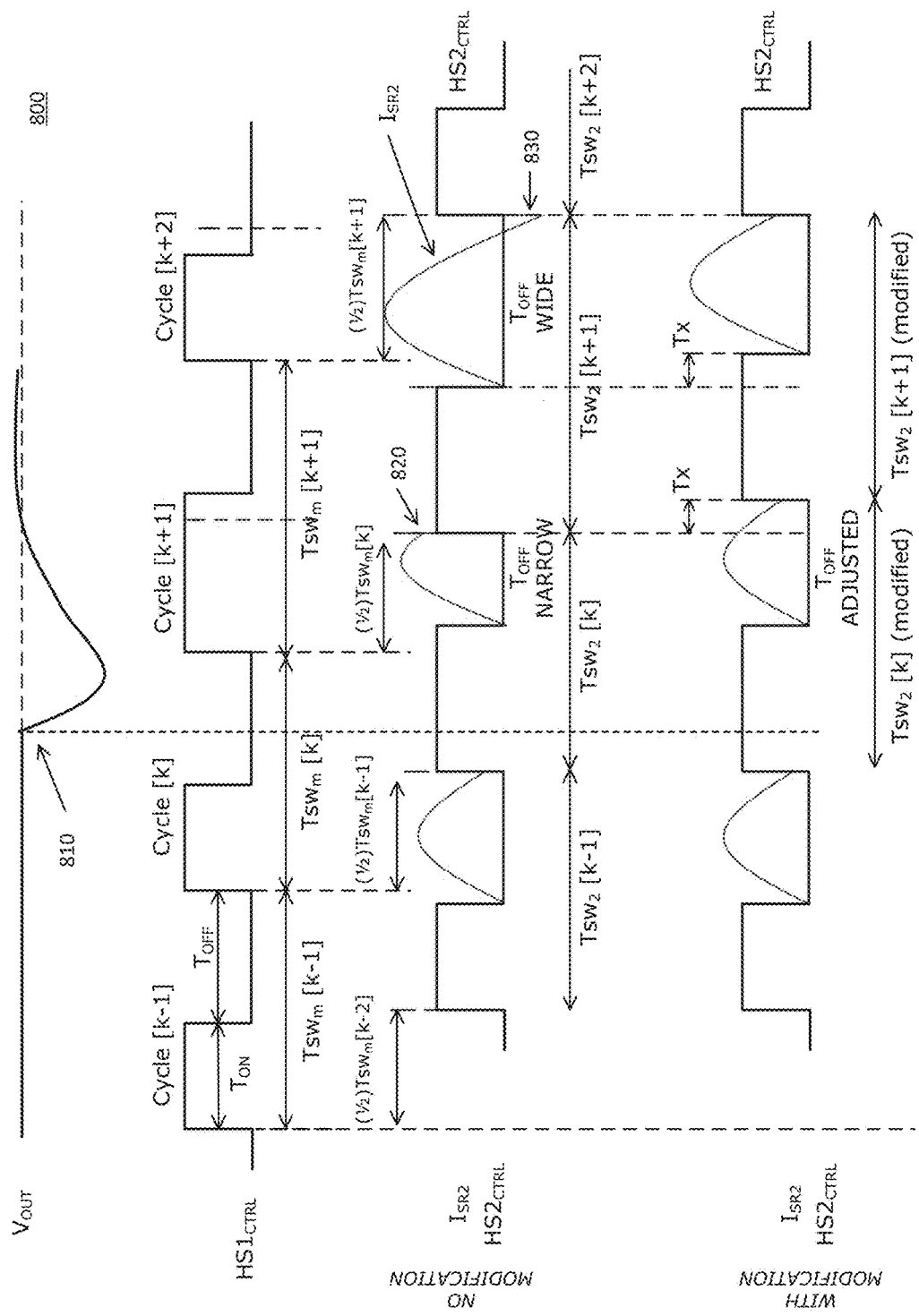
FIG. 8 illustrates PWM waveforms for controlling the high-side switches in a two-phase version of a voltage converter such as that of FIG. 1, and waveforms for the current through the SR switch of a non-master phase, wherein the waveforms have been adjusted, in response to transient load changes, such that negative current through the SR switches is avoided when the SR switches are turned off.

FIG. 8 illustrates waveforms 800 associated with a load transient, and will be used for explaining sub-embodiments that avoid switching SR switches off when they have negative currents, as may occur due to load transients. For ease of illustration, the waveforms 800 are shown for a voltage converter having two (2) phases, but it should be understood that the techniques described below are readily extrapolated to voltage converters having more than two phases. The voltage converter generating the waveforms 800 of FIG. 8 may be a 2-phase version of the voltage converter 100 illustrated in FIG. 1. Phase 1 has been previously selected as the master phase, e.g., during a calibration mode, and the current $I_{SR1}$ flowing through the SR switch for phase 1 is zero (or nearly zero) when this switch is turned off. The current $I_{SR2}$ flowing through the SR switch for phase 2 is slightly positive when this switch is turned off, at least for a steady-state operational period during which there are no load transients.

A load transient (e.g., a sharp increase in the current required by a load 120 of the voltage converter 100) occurs at an instant of time 810, and is indicated by a drop in the output voltage $V_{OUT}$ of the voltage converter 100. This may be detected by the load transient detector 115 that monitors the output voltage $V_{OUT}$. As illustrated in FIG. 8, the load transient occurs during switching cycle k of phase 1 and phase 2. More particularly, the transient 810 occurs when phase 1 is in the $T_{OFF}$ interval of cycle k, whereas phase 2 is in the $T_{ON}$ interval of its cycle k. Note, however, that the described techniques are not restricted to cases in which transients occur with the timing shown in FIG. 8. The techniques are also applicable to other timings including, e.g., cases in which load transients occur during the $T_{ON}$ interval phase 1 and the $T_{OFF}$ interval of phase 2.

The duty cycle ($T_{ON}$ interval) of the switch period for the $2^{nd}$ cycle of phase 2 is increased in response to the load transient. This increase is made so that the voltage converter 100 may supply more power to the load 120. This is shown in FIG. 8 where the $T_{ON}$ interval of the switch period $Tsw_2$[k] is seen to increase relative to the $T_{ON}$ interval of the previous switch period $Tsw_2$[k−1]. However, the start of the next cycle (k+1) for phase 2 is triggered relative to the previous switch period $Tsw_m$[k] of the master phase. This means that the phase 2 switch period $Tsw_2$[k+1] will begin at a point in time that is ½*$Tsw_m$[k] after the start of the corresponding cycle for phase 1, i.e., the start of $Tsw_m$[k+1]. The net effect of this is that the switch period $Tsw_2$[k] is prematurely ended. The SR switch for phase 2 is turned off at a time instant 820 when there is a significant positive current $I_{SR2}$ flowing through the switch. This is illustrated in FIG. 8 by the SR switch current $I_{SR2}$ during the period denoted "$T_{OFF}$ NARROW."

The next switch period of phase 2, i.e., $Tsw_2$[k+2], is started at a point in time that is ½*$Tsw_m$[k+1] after the start of cycle (k+2) for the master phase. The load transient has increased the period for the master phase at cycle (k+1), i.e., $Tsw_m$[k+1] is longer than the previous period $Tsw_m$[k]. The net effect of this for phase 2 is that the beginning of the cycle (k+2) is delayed. For cycle (k+1) of phase 2, the switch period $Tsw_2$[k+1] is too long and, more importantly, has an off interval (denoted by "$T_{OFF}$ WIDE") that allows the SR switch current $I_{SR2}$ to pass through zero and turn negative before the SR switch is turned off 830.

The effect of a step-up load transient, as described above, is that a misalignment is created for the non-master phase 2 and, hence, the SR switch $Q_{SR}$ for phase 2 is switched off when negative current is flowing through it.

The above problem is mitigated by detecting a step-up load transient, e.g., by using the load transient detector 115 within the control circuit 110 of the voltage converter 100, and adjusting the control signal timing in response to this detection. The resultant waveforms are shown in FIG. 8 beside the label "WITH MODIFICATION" Here, the start of the switch period $Tsw_2[k+1]$ is delayed by a time change denoted "Tx." This also increases the switch time period $Tsw_2[k]$. (The resultant periods $Tsw_2[k+1]$ and $Tsw_2[k]$ as denoted as "modified") As shown, the $T_{OFF}$ period is thus increased, as denoted by "$T_{OFF}$ ADJUSTED," in order to allow adequate time for the SR switch current $I_{SR2}$ to decrease further before the SR switch is turned off. Additionally, this delayed start of $Tsw_2[k+1]$ effectively steals "Tx" time from the $T_{OFF}$ interval at the end of $Tsw_2[k+1]$. Hence, the $T_{OFF}$ interval that was previously too wide, as denoted by "$T_{OFF}$ WIDE," is now adjusted so that the SR switch current $I_{SR2}$ at the time instant 830 is no longer negative. As a result of the modified waveform timings, the SR switch is not turned off while negative current is flowing through it even under transient load conditions.

The time delta Tx for delaying the start of a next switch cycle (and increasing the time period for a current switch cycle) is preferably set to the difference between the TON intervals for $Tsw_2[k]$ and $Tsw_m[k-1]$. Alternatively, the time delay Tx could be set to a predetermined value.

FIG. 8 and the description above address the case of a step-up load transient, and explain how adjustments may be made to maintain phase alignment such that the SR switches in the voltage converter 100 are not turned off when negative current is flowing through them. Conversely, the situation is reversed when a step-down transient is detected. For this case, the start of the next switch cycle for the non-master phase would need to be advanced in time by a time delta Tx. (This is the same as shortening the current switch cycle.) The value for Tx may be given by the difference between the $T_{ON}$ intervals for $Tsw_2[k]$ and $Tsw_m[k-1]$, or it may be set to a predetermined value.

Figure 9:
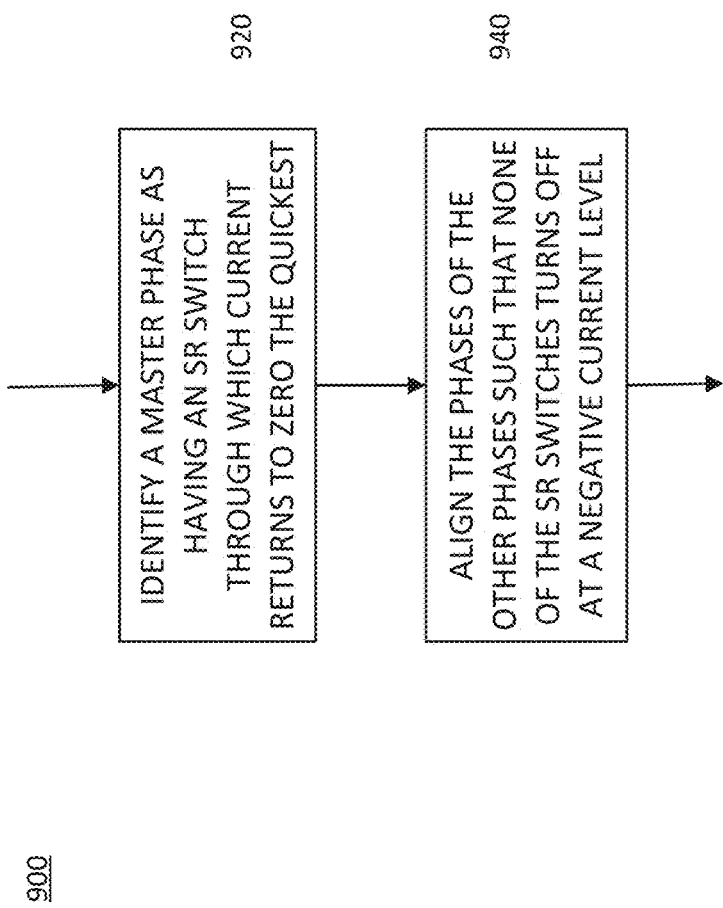
FIG. 9 illustrates a flow diagram corresponding to a method for identifying a master phase and aligning the phases of a multi-phase voltage converter.

FIG. 9 illustrates an embodiment of a method for aligning the phases in a multi-phase voltage converter, such as the voltage converter 100 of FIG. 1. The method may be implemented within a multi-phase voltage converter 100 as illustrated in FIG. 1, and uses techniques similar to those described above regarding the control circuit 110 of the voltage converter 100.

The method begins by identifying 920 a master phase from among the phases in a voltage converter. This is accomplished by generating control signals, such as PWM signals, to control high-side, low-side, and SR switches for each phase of the voltage converter, using techniques as described previously for the control circuit 110 of FIG. 1, and having waveform timings 600 as shown in FIG. 6. Currents through the SR switches, each of which has a half-cycle sinusoidal shape, are then measured to identify which phase has the SR current that returns to zero the fastest, as illustrated in the waveforms of FIG. 6. The identified phase is determined to be the master phase. The control signal timings for the other phases are then aligned 940 to the timings of the master phase, such that none of the SR switches turn off when the current flowing through them is at a negative level.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A multi-phase voltage converter, comprising:
   a plurality of phases, each phase comprising:
      a high-side switch connected between an input voltage terminal and a switching node;
      a low-side switch connected between the switching node and ground;
      a passive circuit connectingthe switching node to a common output node of the multi-phase voltage converter; and
      a synchronous rectification (SR) switch connected between the passive circuit and ground and through which a half-cycle sinusoidal-like current is conducted when turned on; and
   a control circuit operable to:
      identify, from the plurality of phases, a master phase having the SR switch through which the half-cycle sinusoidal-like current returns to zero more quickly than the half-cycle sinusoidal-like current returns to zero in the SR switches of other phases of the plurality of phases; and
      align the phases for a switching cycle based on a switching period of the master phase, so that none of the SR switches turn off at a negative current level.

2. The multi-phase voltage converter of claim 1, wherein the control circuit is operable to identify the master phase during a calibration mode which precedes a normal operational mode of the multi-phase voltage converter.

3. The multi-phase voltage converter of claim 2, wherein the control circuit is operable to measure the current of each phase using a fixed switching frequency in the calibration mode and compare the current measurements to identify the master phase.

4. The multi-phase voltage converter of claim 2, wherein the control circuit is operable to re-enter the calibration mode after a period of normal operation so as to identify a new master phase, the new master phase having the SR switch through which the half-cycle sinusoidal-like current returns to zero more quickly than the half-cycle sinusoidal-like current returns to zero in the SR switches of other phases of the plurality of phases.

5. The multi-phase voltage converter of claim 1, wherein the control circuit is operable to vary the switching period of the master phase from cycle-to-cycle.

6. The multi-phase voltage converter of claim 1, wherein for a present switching cycle, the control circuit is operable to use the switching period of the master phase from an immediately preceding switching cycle as a reference period for aligning the phases in the present switching cycle.

7. The multi-phase voltage converter of claim 6, wherein the control circuit is operable to adjust the reference period responsive to a transient condition at a load coupled to the multi-phase voltage converter so that the phases remain aligned during the transient condition.

8. The multi-phase voltage converter of claim 7, wherein the control circuit is operable to increase the reference period by a first predetermined amount responsive to a step-up transient condition at the load so that the phases remain aligned during the step-up transient condition.

9. The multi-phase voltage converter of claim 7, wherein the control circuit is operable to decrease the reference period by a second predetermined amount responsive to a step-down transient condition at the load so that the phases remain aligned during the step-down transient condition.

10. The multi-phase voltage converter of claim 6, wherein for the present switching cycle, the control circuit is operable to increment a counter at a defined frequency over the reference period for the immediately preceding switching cycle and align the phases based on the counter output and the number of phases.

11. The multi-phase voltage converter of claim 1, wherein for each phase, the passive circuit comprises an LC tank coupled to the switching node of that phase and a center-tapped inductor for coupling the LC tank to an output capacitor of the multi-phase voltage converter, and the SR switch is coupled between the center-tapped inductor and ground.

12. A method of phase alignment for a multi-phase voltage converter, each phase of the multi-phase voltage converter including a high-side switch connected between an input voltage terminal and a switching node, a low-side switch connected between the switching node and ground, a passive circuit connecting the switching node to a common output node of the multi-phase voltage converter, and a synchronous rectification (SR) switch connected between the passive circuit and ground and through which a half-cycle sinusoidal-like current is conducted when turned on, the method comprising:
  identifying, from the multiple phases of the voltage converter, a master phase having the SR switch through which the half-cycle sinusoidal-like current returns to zero more quickly than the half-cycle sinusoidal-like current returns to zero in the SR switches of other ones of the multiple phases; and
  aligning the phases for a switching cycle based on a switching period of the master phase, so that none of the SR switches turn off at a negative current level.

13. The method of claim 12, wherein the master phase is identified during a calibration mode that precedes a normal operational mode of the multi-phase voltage converter.

14. The method of claim 13, wherein identifying the master phase comprises:
  measuring the current of each phase at a fixed frequency in the calibration mode; and
  comparing the current measurements to identify the master phase.

15. The method of claim 13, further comprising:
  re-entering the calibration mode after a period of normal operation so as to identify a new master phase, the new master phase having the SR switch through which the half-cycle sinusoidal-like current returns to zero more quickly than the half-cycle sinusoidal-like current returns to zero in the SR switches for other ones of the multiple phases.

16. The method of claim 12, wherein the switching period of the master phase is varied from cycle-to-cycle.

17. The method of claim 12, wherein aligning the phases comprises:
  using the switching period of the master phase from an immediately preceding switching cycle as a reference period for aligning the phases in a present switching cycle.

18. The method of claim 17, further comprising:
  adjusting the reference period responsive to a transient condition at a load coupled to the multi-phase voltage converter so that the phases remain aligned during the transient condition.

19. The method of claim 18, wherein adjusting the reference period comprises:
  increasing the reference period by a first predetermined amount responsive to a step-up transient condition at the load so that the phases remain aligned during the step-up transient condition.

20. The method of claim 18, wherein adjusting the reference period comprises:
  decreasing the reference period by a second predetermined amount responsive to a step-down transient condition at the load so that the phases remain aligned during the step-down transient condition.

21. The method of claim 17, wherein using the switching period of the master phase from the immediately preceding switching cycle as a reference period for aligning the phases in the present switching cycle comprises:
  incrementing a counter, during the present switching cycle, at a defined frequency over the reference period for the immediately preceding switching cycle; and
  aligning the phases based on the counter output and the number of phases.

* * * * *

UNITED STATES PATENT AND TRADEMARK OFFICE
CERTIFICATE OF CORRECTION

PATENT NO. : 9,899,930 B2
APPLICATION NO. : 15/154434
DATED : February 20, 2018
INVENTOR(S) : A. Babazadeh It is certified that error appears in the above-identified patent and that said Letters Patent is hereby corrected as shown below:

Column 14, Line 31 (Claim 1, Line 8), please change "connectingthe" to -- connecting the --.

Column 16, Line 18 (Claim 16, Line 1), please change "claim 12." to -- claim 12, --.

Signed and Sealed this
Seventeenth Day of April, 2018

Andrei Iancu
*Director of the United States Patent and Trademark Office*